United States Patent [19]

Irie

[11] Patent Number: 5,761,275
[45] Date of Patent: Jun. 2, 1998

[54] TELEPHONE ANSWERING MACHINE WITH AUDIO SIGNAL COMPRESSION/EXPANSION CIRCUIT

[75] Inventor: Kenji Irie, Kanagawa, Japan

[73] Assignee: Sony Corporation, Tokyo, Japan

[21] Appl. No.: 623,993

[22] Filed: Mar. 29, 1996

[30] Foreign Application Priority Data

Apr. 6, 1995 [JP] Japan ................................. 7-106996

[51] Int. Cl.⁶ ..................................................... H04M 1/64
[52] U.S. Cl. ............................ 379/88; 379/395; 704/225
[58] Field of Search ................................. 379/67, 88, 89,
379/398, 399, 387, 388, 390, 395; 704/219,
220, 224, 225, 226

[56] References Cited

U.S. PATENT DOCUMENTS

| | | | |
|---|---|---|---|
| 5,400,393 | 3/1995 | Knuth et al. | 379/88 |
| 5,452,289 | 9/1995 | Sharma et al. | 370/32.1 |
| 5,483,577 | 1/1996 | Gulick | 379/67 |
| 5,546,395 | 8/1996 | Sharma et al. | 704/219 |

Primary Examiner—Krista Zele
Assistant Examiner—Scott L. Weaver
Attorney, Agent, or Firm—Jay H. Maioli

[57] ABSTRACT

An improved telephone answering machine having a codec circuit 31 for converting an audio signal input/output from/to a telephone line 3 from analog to digital or digital to analog, a DSP 32 and a memory 33 for storing the supplied digital audio signal. The DSP 32 is adapted to compress data of the digital audio signal, to expand the compressed data of the digital audio signal and to correct the supplied digital audio signal so that the level of an analog audio signal after conversion from digital to analog becomes constant. When recording, the analog audio signal is recorded in the memory 33 via the codec circuit 31 and the DSP 32. When reproducing it, the audio signal recorded in the memory 33 is taken out via the DSP 32 and the codec circuit 31. Because the level of the digital audio signal is controlled in the DSP 32, the sound quality of an OGM or ICM is substantially improved in the telephone answering machine.

3 Claims, 2 Drawing Sheets

TELEPHONE ANSWERING MACHINE WITH AUDIO SIGNAL COMPRESSION/EXPANSION CIRCUIT

BACKGROUND OF THE INVENTION

The present invention relates to a telephone answering machine and more particularly to a telephone answering machine adapted to control the level of an audio signal by a digital signal processing circuit.

The telephone answering machine is constructed such that when there is a telephone call while the telephone set is in an answering mode, the following steps are taken:

(1) turns to an off-hook state;
(2) reproduces OGM (outgoing message: a message informing a caller of the phone call when the telephone is rung that a pertinent person is absent) prepared in advance and sends its audio signal to the telephone line;
(3) records audio signals of ICM (incoming message: a message of business from the caller); and
(4) hang up the phone when the ICM ends to return to the standby state.

To that end, an audio signal system of the telephone answering machine is constructed as shown in FIG. 1 for example. That is, the telephone answering machine has a transmitter 11, a receiver 12, a line interface circuit 15 and a switching circuit 16. In this case, the line interface circuit 15 has a 4-line/2-line converting circuit. The switching circuit 16 corresponds to a hook switch of a standard telephone set. It is composed of a relay contact for example for hooking/releasing a telephone line.

When the telephone set is in the on-hook or hang up state, the switching circuit 16 is turned off and when it is in the off-hook state, the switching circuit 16 is turned on and the line interface circuit 15 is connected to a telephone line 3 via the switching circuit 16.

The telephone set includes a speaker 21 and a microphone 22 and has an AGC (auto-gain control) circuit 27 and a recording/reproducing circuit 30. The speaker 21 is used for listening to an ICM and the microphone 22 is used for recording an OGM. The AGC circuit 27 is used to adjust the recording level of audio signals of the ICM/OGM to a standard value in recording it.

The recording/reproducing circuit 30 is used for recording/reproducing the audio signal of the OGM/ICM. In this example, the audio signal of the OGM/ICM is stored (recorded) in a memory. To that end, the recording/reproducing circuit 30 has a codec circuit 31, a DSP (digital signal processor) 32 and a memory 33.

The codec circuit 31 comprises an A/D converter for converting the audio signal of the OGM/ICM from analog to digital and a D/A converter for converting the digital signal into an analog signal and performs an auxiliary process of compressing/expanding data as well.

The DSP 32 compresses data when the digital audio signal of the OGM/ICM is recorded and expands it when it is reproduced. The memory 33 is used for recording (storing) the digital audio signal of the OGM/ICM. It has a capacity of 4M bits for example and is capable of recording the OGM and ICM by about 10 minutes in total.

The switching circuit 16 and 41 through 44 are controlled and switched corresponding to operation modes of the telephone set by a microcomputer not shown. Each of the operation modes is realized as follows:

Speech

During a speech or normal conversation, an audio signal from the transmitter 11 is sent out to the line 3 through an audio signal line of an amplifier 13, the switching circuit 41, the line interface circuit 15 and the switching circuit 16.

An audio signal of the person on the other end of the line is supplied to the receiver 12 through an audio signal line of the line 3, the switching circuit 16, the line interface circuit 15, the switching circuit 42 and the amplifier 14.

Thus, a speech or normal conversation can be made with the person on the other end of the line by using the transmitter 11 and the receiver 12.

Recording of OGM

This is a case when the user records any desired OGM in the memory 33. In this case, an audio signal from the microphone 22 is supplied to the codec circuit 31 through an audio signal line of an amplifier 24, the switching circuit 44 and the AGC circuit 27.

Then, the audio signal of the OGM is converted into a digital signal in the codec circuit 31. This digital OGM audio signal is written in the memory 33 after being compressed by the DSP 32.

Thus, the user can record the OGM at will.

Reproduction of OGM

This is an operation made when there is an incoming call while the telephone set is in the answering mode.

That is, when there is the incoming call, the digital audio signal of the OGM is read out of the memory 33. The digital audio signal is expanded by the DSP 32 and is supplied to the codec circuit 31 to be converted into the original analog OGM audio signal.

Then, the audio signal of this OGM is sent out to the line 3 through an audio signal line of an amplifier 28, the switching circuit 43, an amplifier 25, the switching circuit 41, the line interface circuit 15 and the switching circuit 16.

Thus, the caller of the phone can listen to the OGM.

Recording of ICM

This is an operation made when the caller of the phone records an ICM in succession to the above-described "Reproduction of OGM".

In this case, an audio signal of the ICM of the caller is supplied to the codec circuit 31 through an audio signal line of the line 3, the switching circuit 16, the line interface circuit 15, the switching circuit 42, the amplifier 26, the switching circuit 44 and the AGC circuit 27.

Then, the audio signal of the ICM is converted into a digital audio signal in the codec circuit 31. The digital audio signal of the ICM is compressed by the DSP 32 and is written in the memory 33.

Thus, the caller of the phone call can record the ICM.

Reproduction of ICM

This is an operation made when the user reproduces the recorded ICM to listen to it.

In this case, the digital audio signal of the ICM is read out of the memory 33. It is expanded by the DSP 32 and is supplied to the codec circuit 31 to convert into the original analog ICM audio signal. Then, the audio signal of the ICM is supplied to the speaker 21 through an audio signal line of the amplifier 28, the switching circuit 43 and the amplifier 23.

Thus, the user can listen to the ICM recorded in the memory 33 through the speaker 21.

By the way, while the microphone 22 included in the telephone answering machine is used in recording the OGM in the telephone set described above, the distance from the telephone set varies when the user speaks to the microphone 22 to record the OGM.

When the user speaks to the microphone 22 at a distant position, the level of the audio signal of the OGM collected by the microphone 22 becomes low. As a result, voice of the recorded OGM becomes small as well, posing a problem in actually using it.

Then, the AGC circuit 27 is provided as described above in an actual telephone set so that the audio signal of the OGM is recorded at a predetermined level even if the user speaks to the microphone at a distant position in recording the OGM.

By the way, the AGC circuit is generally arranged so as to detect the level of an input signal and to change the gain of an amplifier by the detected signal to adjust the level of the input signal to a target value. An input signal level detecting section thereof has a time constant circuit.

Due to that, the provision of the AGC circuit 27 adds to the cost considerably by itself. Further, because the time constant circuit is composed of a capacitor and a resistor, the time constant may vary or change depending on temperatures. As a result, the gain of the AGC circuit 27 may be varied or changed depending on temperatures.

Further, because no signal is supplied to the time constant circuit when the ICM or OGM is about to be spoken, the gain of the AGC circuit becomes large and hence, the level of the audio signal of the ICM or OGM to be output deviates from the target value.

Accordingly, it is an object of the present invention to solve the aforementioned problems of the conventional telephone answering machine by providing an improved telephone answering machine.

SUMMARY OF THE INVENTION

In order to achieve the aforementioned object, according to the present invention, there is provided an improved telephone answering machine having a recording circuit for recording an incoming message and a reproducing circuit for reproducing the incoming message, including an analog-digital converter for converting an incoming message into digital data; a digital signal processor for compressing and level-adjusting the digital data; a memory for storing the compressed level-adjusted digital data therein by the recording circuit; the digital signal processor further including means for expanding the compressed level-adjusted digital data read out of the memory by the reproducing circuit, and a digital-analog converter for converting the expanded data by the digital signal processor into the analog data.

In recording, an analog audio signal is converted into a digital audio signal in the codec circuit. The digital audio signal is compressed in the digital signal processor and the compressed digital audio signal is written to the memory.

In reproducing it, the digital audio signal is read out of the memory. The read digital audio signal is expanded and level-adjusted by the digital signal processor. The data-expanded and level-adjusted digital audio signal is then supplied to the codec circuit to take out the original analog audio signal therefrom.

That is, the digital signal processor corrects the level of the audio signal when it turns to the analog audio signal to the optimum value.

The specific nature of the invention, as well as other objects, uses an advantages thereof, will clearly appear from the description and from the accompanying drawings in which like numerals refer to like parts.

DETAILED DESCRIPTION OF PREFERRED EMBODIMENT

Figure 1:
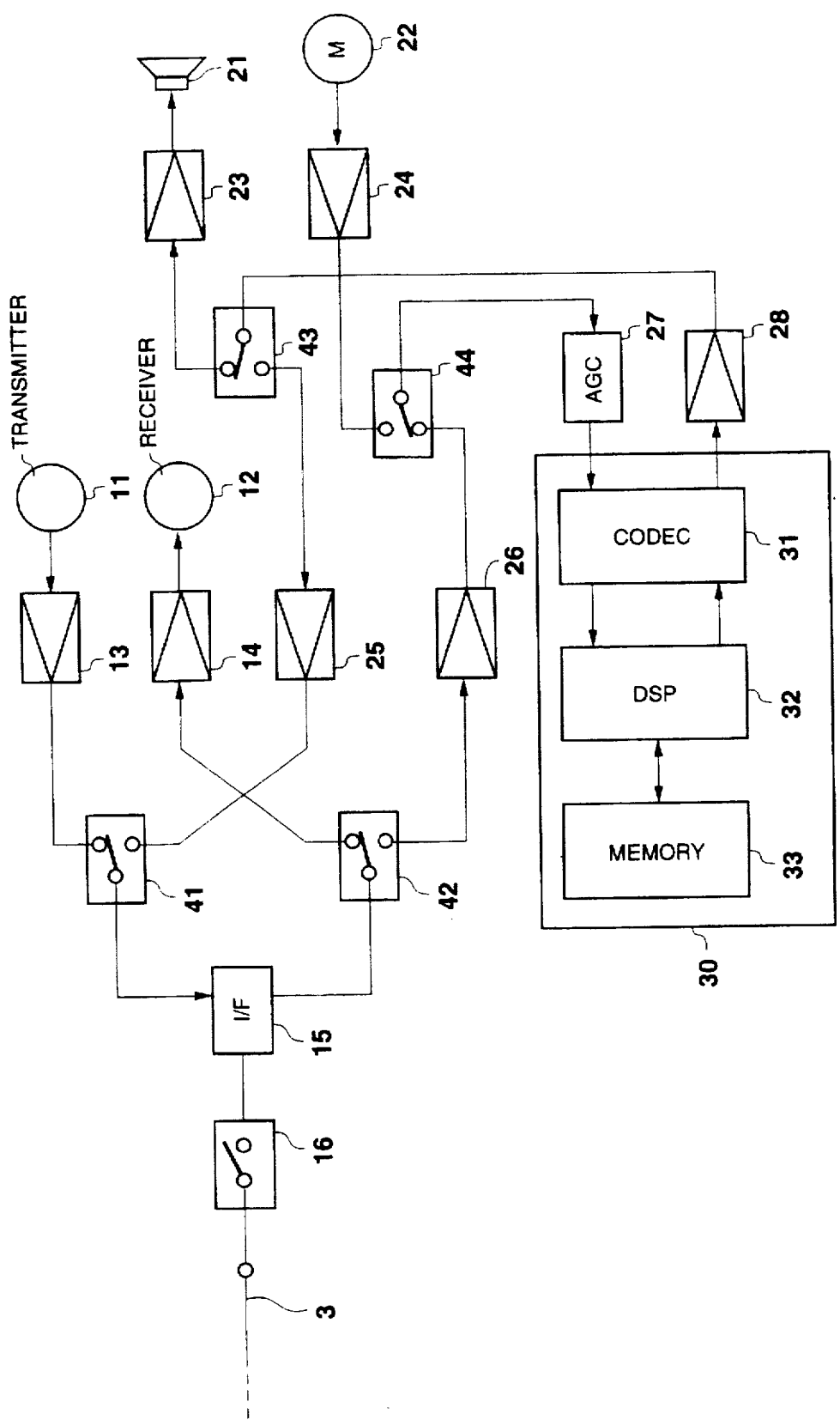
FIG. 1 is a block diagram of a conventional telephone answering machine.
Figure 2:
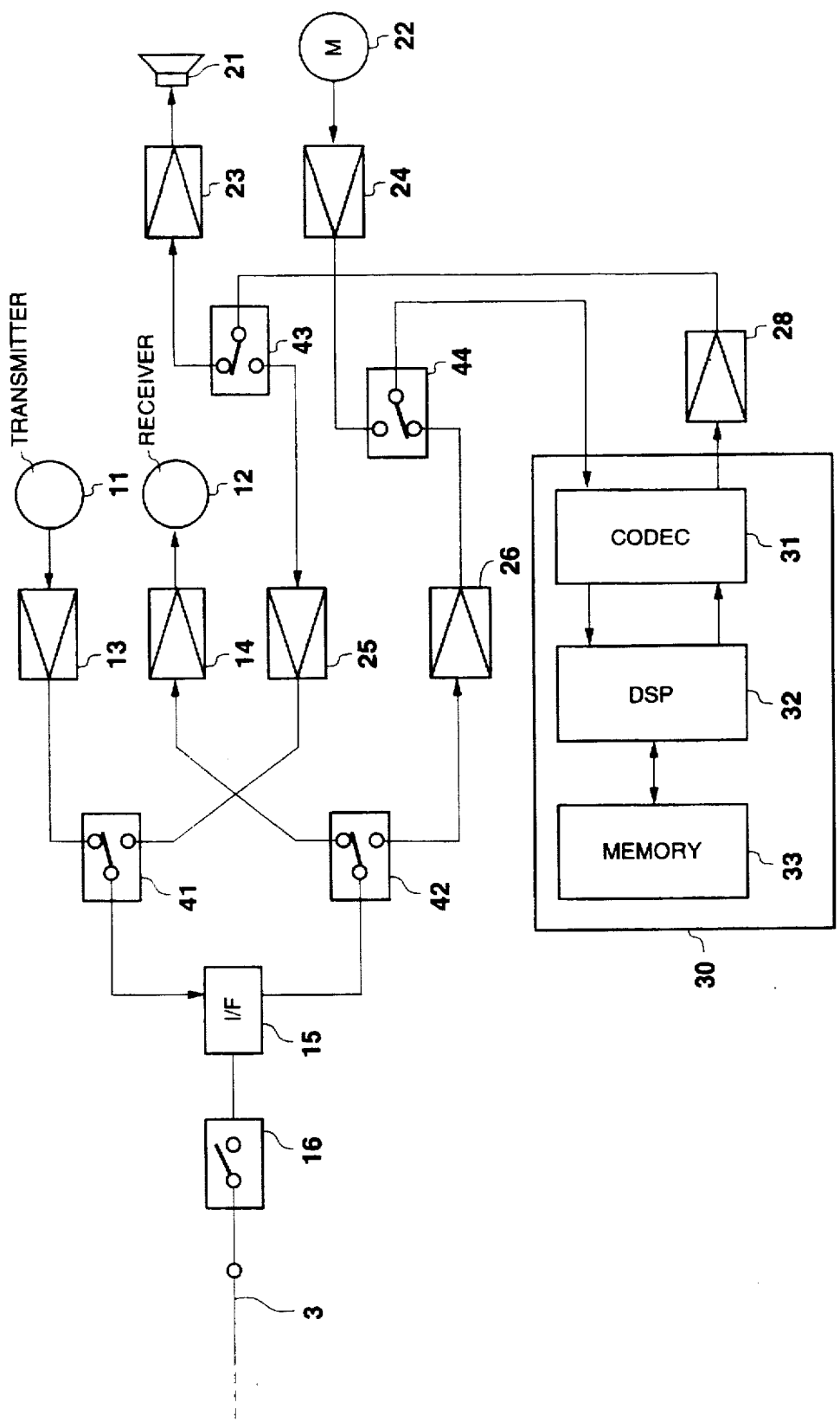
FIG. 2 is a block diagram of a telephone answering machine according to an embodiment of the present invention.

A preferred embodiment of the present invention will be explained with reference to FIG. 2 which is a block diagram of an inventive telephone answering machine. As shown in the figure, the telephone set has a transmitter 11, a receiver 12, a line interface circuit 15 and a switching circuit 16. In this case, the line interface circuit 15 has a 4-line/2-line converting circuit. The switching circuit 16 corresponds to a hook switch of a standard telephone set. It is composed of, for example, a relay contact for hooking/releasing a telephone line.

When the telephone set is in an on-hook or hand up state, the switching circuit 16 is off and when it is in an off-hook state, the switching circuit 16 is on and the line interface circuit 15 is connected to a telephone line 3 via the switching circuit 16.

The telephone set includes a speaker 21 and a microphone 22 and has a recording/reproducing circuit 30. The speaker 21 is used for listening an ICM (and OGM) and the microphone 22 is used for recording an OGM.

The recording/reproducing circuit 30 is used for recording/reproducing an audio signal of the OGM/ICM. In this example, the audio signal of the OGM/ICM is stored in a memory. To that end, the recording/reproducing circuit 30 has a codec circuit 31, a DSP 32 and a memory 33.

The codec circuit 31 comprises an A/D converter for converting the audio signal of the OGM/ICM from analog to digital and a D/A converter for converting the digital signal into the analog signal and performs an auxiliary processing for compressing/expanding data as well.

The DSP 32 compresses data when the digital audio signal of the OGM/ICM is recorded and expands it when it is to be reproduced. The DSP 32 also corrects a level of the analog audio signal so that it is adjusted to a standard value when it is converted from the digital audio signal of the OGM/ICM in reproducing it.

The memory 33 is used to record the digital audio signal of the OGM and ICM, it has a capacity of 4M bits for example and is capable of recording the OGM and ICM for about 10 minutes in total.

The switching circuit 16 and 41 through 44 are controlled and switched corresponding to operation modes of the telephone set by a microcomputer not shown, Each of the operation modes is realized as follows:

Speech

During a speech or normal conversation, an audio signal from the transmitter 11 is sent out to the line 3 through an audio signal line of an amplifier 13, the switching circuit 41, the line interface circuit 15 and the switching circuit 16.

An audio signal of the person on the other end of the line is supplied to the receiver 12 through an audio signal line of the line 3, the switching circuit 16, the line interface circuit 15, the switching circuit 42 and the amplifier 14.

Thus, a speech can be made with the person on the other end of the line by using the transmitter 11 and the receiver 12.

Recording of OGM

This is a case when the user records any desired OGM in the memory 33. An audio signal from the microphone 22 is supplied to the codec circuit 31 through an audio signal line of an amplifier 24 and the switching circuit 44.

Then, the audio signal of the OGM is converted into a digital signal in the codec circuit 31. This digital OGM audio signal is written in the memory 33 after being compressed by the DSP 32.

Thus, the user can record the OGM at will.

Reproduction of OGM

This is an operation made when there is an incoming call while the telephone set is set in an answering mode.

That is, when there is an incoming call, the digital audio signal of the OGM is read out of the memory 33 first. Then, the DSP 32 checks the energy level of the recorded content of the digital audio signal and sets a gain in the DSP, or 32 gain with respect to the analog audio signal converted from the digital audio signal to a value corresponding to the result of the check. That is, the gain in the DSP 32 is set in accordance with the level of the audio signal of the OGM recorded in the memory 33 when it is converted from digital to analog.

Then, the digital audio signal of the OGM is read out of the memory 33 sequentially and is expanded by the DSP 32. At this time, the level (level of the analog audio signal when converted from digital to analog) of the digital audio signal is corrected in accordance with the gain set in the DSP 32. The data-expanded and level-adjusted digital audio signal is supplied to the codec circuit 31 to be converted into the original analog OGM audio signal.

Then, the audio signal of this OGM is sent to the line 3 through an audio signal line of an amplifier 28, the switching circuit 43, an amplifier 14, the switching circuit 41, the line interface circuit 15 and the switching circuit 16.

Thus, the caller of the phone can listen the OGM. At this time, the gain of the DSP 32 is set in accordance with the level of the audio signal recorded in the memory 33, so that the audio signal output from the codec circuit 31 is adjusted to an appropriate level regardless of the level in recording to the memory 33.

Recording of ICM

This is an operation made when the caller of the phone call records an ICM in succession to the above-described "Reproduction of OGM".

In this case, an audio signal of the ICM of the caller is supplied to the codec circuit 31 through an audio signal line of the line 3, the switching circuit 16, the line interface circuit 15, the switching circuit 42, the amplifier 26 and the switching circuit 44.

Then, the audio signal of the ICM is converted into a digital audio signal in the codec circuit 31. The digital audio signal of the ICM is compressed by the DSP 32 and is written in the memory 33.

Thus, the caller can record the ICM.

Reproduction of ICM

This is an operation made when the user reproduces the ICM recorded in the memory 33 to listen to it.

In this case, a gain of the DSP 32 is set corresponding to an average level of the audio signal of the ICM recorded in the memory 33 at first similarly to the case of "Reproduction of OGM". Next, the digital audio signal of the ICM is read out of the memory 33.

The digital audio signal is expanded and level-adjusted in the DSP 32 and is then supplied to the codec circuit 31 to be converted into the original analog ICM audio signal. Then, the audio signal of the ICM is supplied to the speaker 21 through an audio signal line of the amplifier 28, the switching circuit 43 and the amplifier 23.

Thus, the user can listen to the ICM recorded in the memory 33 through the speaker 21.

As described above, the telephone answering machine according to an embodiment of the present invention requires no AGC circuit, so that its cost can be reduced considerably.

Further, because the reproduction level of the audio signal is adjusted from the overall energy of the audio signal in reproducing the OGM/ICM, the sound quality thereof may be improved. Still more, because the digital audio signal written in the memory 33 allows an average level or a peak level of the audio signal to be readily known especially in reproducing it, the complexity of the program in the DSP 32 can be reduced.

It is noted that although the level has been adjusted so that the level of the analog audio signal converted from the digital audio signal is adjusted to an adequate value in the DSP 32 only in reproducing the OGM/ICM in the embodiment described above, the level may be corrected also in recording them. That is, the level of the audio signal may be adjusted in recording the OGM/ICM as follows.

An audio signal of the input OGM/ICM is converted into a digital audio signal in the codec circuit 31. The audio signal converted into the digital signal is supplied to the DSP 32 to be compressed. At this time, an average level of the input audio signal is checked to set an adequate gain. The level of the digital audio signal is adjusted in accordance with the set gain in the DSP 32.

Then, the compressed and level-adjusted digital audio signal is supplied to the memory 33.

When the level of the audio signal is corrected in recording it as described above, the level needs not be corrected in the DSP 32 when it is reproduced.

While a preferred embodiment of the present invention has been described, variations thereof will be understood by those skilled in the art which will fall within the scope of the present invention as delineated by the following claims.

What is claimed is:

1. A telephone answering machine including a recording circuit for recording an incoming message and a reproducing circuit for reproducing said incoming message, said telephone answering machine comprising:

an analog-digital converter for converting said incoming message into digital data;

a digital signal processor for compressing, expanding, and level-adjusting said digital data;

a memory for storing said compressed digital data from said digital signal processor under control of said recording circuit, wherein said digital signal processor includes means for expanding said compressed digital data read out from said memory under control of said reproducing circuit and for level adjusting the expanded digital data, and wherein said digital signal processor performs said level-adjusting only when said digital data is read out from said memory; and a digital-analog converter for converting said digital data expanded and level adjusted by said digital signal processor into analog data.

2. A telephone answering machine including a recording circuit for recording an incoming message and a reproducing circuit for reproducing said incoming message, said telephone answering machine comprising:

an analog-digital converter for converting said incoming message into digital data;

a data compression circuit for compressing said digital data;

a memory for storing said compressed digital data under control of said recording circuit;

a data expansion circuit for expanding said compressed digital data read out from said memory under control of said reproducing circuit;

a level control circuit for level-adjusting said expanded digital data under control of said reproducing circuit, wherein said level control circuit performs said level-adjusting only when said digital data is read out from said memory; and a digital-analog converter for converting said digital data expanded by said expansion circuit and level adjusted by said level control circuit into analog data.

3. A method for use with a telephone answering machine to affect a sound quality of a message, comprising the steps of:

analog-to-digital converting said message to obtain a digitized message;

compressing said digitized message to obtain a compressed digitized message;

storing said compressed digitized message into a memory;

reading out from said memory said compressed digitized message;

expanding said compressed digitized message read out from said memory;

adjusting a level of said expanded digitized message only when said digitized message is read out from said memory; and digital-to-analog converting said expanded and level-adjusted digitized message, thereby reproducing said message at a constant level over a wide range of input message levels.

\* \* \* \* \*